E. E. BUTTS.
ATTACHMENT FOR COOKING VESSELS.
APPLICATION FILED MAR. 9, 1920.
1,384,597.
Patented July 12, 1921.
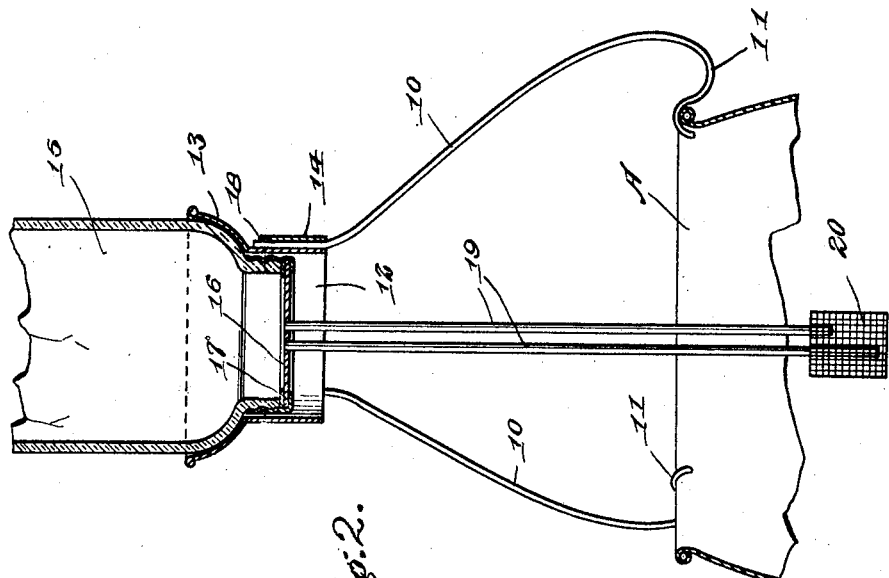
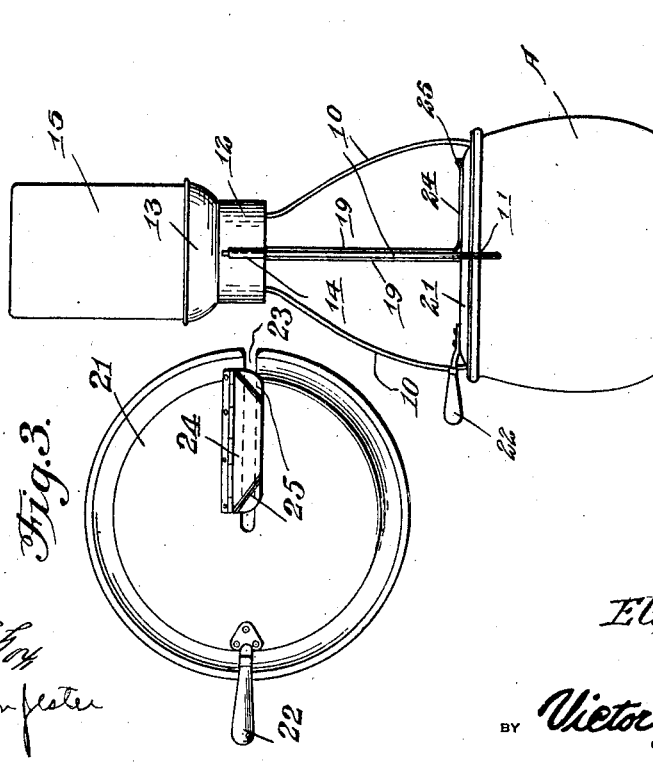
Elmer. E. Butts.
INVENTOR
BY Victor J. Evans
ATTORNEY
WITNESSES:

UNITED STATES PATENT OFFICE.

ELMER E. BUTTS, OF ARKANSAS CITY, KANSAS.

ATTACHMENT FOR COOKING VESSELS.

1,384,597.  Specification of Letters Patent.  Patented July 12, 1921.

Application filed March 9, 1920. Serial No. 364,491.

*To all whom it may concern:*

Be it known that I, ELMER E. BUTTS, a citizen of the United States, residing at Arkansas City, in the county of Cowley and State of Kansas, have invented new and useful Improvements in Attachments for Cooking Vessels, of which the following is a specification.

This invention relates to cooking vessels, particularly to attachments therefor, and has for its object the provision of a device adapted to be engaged upon a boiling pot whereby water may be fed to the pot as it boils away, thereby preventing the burning of any articles being cooked, the action being entirely automatic.

Another object is the provision of a device of this character with which is associated a lid for the pot, the lid being of novel construction whereby it may be engaged upon the pot without interference with my device.

An additional object is the provision of a water feed of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a side elevation of my device in position upon a pot, the lid also being in position, Fig. 2 is a longitudinal sectional view through the device in position, and Fig. 3 is a plan view of the lid.

Referring more particularly to the drawings, the letter A designates a kettle or pot which may be of any ordinary or preferred construction and which does not form a part of my invention. In carrying out my invention I provide a support which includes a plurality of legs 10, preferably three in number, formed of heavy wire or thin rods and these legs are bent at their lower ends, as shown at 11, for engagement upon the top of the pot. The legs converge toward their upper ends and are connected at their upper ends by a ring-like member 12 which has its upper end flared outwardly, as shown at 13. The upper ends of the legs may be riveted or otherwise secured to the ring 12 though it is preferable that they engage within sockets 14 extending from the ring so that they may be disassembled from the ring for convenience in transportation or storage.

Associated with this stand formed by the legs and ring member, is a reservoir 15 which may conveniently be an ordinary fruit jar upon the open end of which is disposed a disk 16 engaged by a rubber gasket 17 and held in position by a crown cap 18 screwed onto the jar. Connected with the disk 16 are tubes 19 which are of a length to extend down into the pot A when the jar or reservoir 15 is inverted and placed within the ring member 12. At their lower ends these tubes 19 carry a cage 20 of wire mesh, for a purpose to be described.

In the use of the device the jar or reservoir 15 is filled with water, the gasket 17 and disk 16 are disposed upon the open end thereof and the cap 18 is screwed into place. It is understood that the pot A contains water and the articles or substances to be cooked. The jar 15 is then inverted and placed within the ring member 12, the flared end 13 holding the jar in position. The tubes 19 will then extend into the water within the pot. As the water in the pot boils away and the level falls below the end of the shorter of the tubes 19, air will enter this shorter tube and pass upwardly into the jar and water will flow from the jar through the longer tube into the pot until the water level in the pot is sufficiently high to seal the end of the shorter tube. In this way it will be readily observed that the water level within the pot will be maintained constant as long as there is any water in the reservoir jar. The purpose of the cage 20 is to prevent any of the substance being cooked from clogging the tubes 19.

In order that the kettle may be covered while my device is in position thereon, I provide a lid 21 which is circular in shape and which is adapted for disposition upon the pot. This lid is provided at one side with a handle 22 and is also provided with a slot 23 extending from one edge past the center, this slot being for the accommodation of the tubes 19. In order to close the slot when the lid is used in the absence of my device, I provide a cover plate 24 hinged at one side of the slot and having inclined upturned ends 25 arranged at such an angle that when the plate is in position closing the slot and the lid is placed upon the pot, the engagement of the tubes 19 with the end of the plate will cause the same to be elevated so that the lid may be slid onto the pot with the tubes passing along the slot 23.

From the foregoing description and a study of the drawings it will be apparent that I have thus provided a very efficient means for maintaining a constant water level within a pot or kettle, the device fully performing all the functions for which it is intended.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising a tripod structure including legs detachably engageable upon the edge of a kettle and a ring member carried by the upper ends of the legs, a water reservoir formed as a jar arranged in inverted position with its outlet end fitting within said ring member, a closure for the end of said reservoir, and a pair of tubes leading through said closure and adapted to extend into water within the kettle, said tubes being of unequal length.

2. A device of the character described comprising a supporting structure including legs detachably engageable upon the edge of a kettle, and a ring member carried by the upper ends of the legs, a water reservoir having a threaded neck and disposed in inverted position in engagement with said ring member, a closure cap screwed upon said threaded neck, and a pair of tubes carried by said closure cap and communicating with the interior of the reservoir, said tubes extending into water within the kettle.

3. A device of the character described comprising a tripod structure adapted for detachable engagement upon the edge of a kettle and including a ring-like member, a water reservoir supported upon said ring-like member, and a pair of tubes carried by the reservoir, extending therein, and having their lower ends disposed within water in the kettle, said tubes being of unequal lengths whereby when the water level within the kettle drops below the lower end of the shorter tube air will enter the reservoir through the shorter tube and water will pass from the reservoir through the longer tube into the kettle.

4. A device of the character described comprising a supporting structure including legs detachably engageable upon the edge of a kettle, and a ring member carried by the upper ends of the legs, a water reservoir formed as a jar having a threaded neck, a disk engaged upon the end of the jar neck, a cap member threaded upon the neck and holding the disk thereagainst whereby to form a closure for the jar, and a pair of tubes carried by the disk and communicating with the interior of the jar, said jar being disposed in inverted position upon said ring member with said tubes extending into water within a kettle, said tubes being of unequal length.

In testimony whereof I affix my signature.

ELMER E. BUTTS.